United States Patent [19]

Hildenbrand

[11] 3,885,105

[45] May 20, 1975

[54] CODE MULTIPLEX METHOD USING A BINARY CHANNEL

[75] Inventor: Rupert Hildenbrand, Ulm, Danube, Germany

[73] Assignee: Liicentia-Pantent-Verwaltungs-G.m.b.H, Frankfurt am Main, Germany

[22] Filed: Oct. 23, 1973

[21] Appl. No.: 408,639

[30] Foreign Application Priority Data

Oct. 26, 1972 Germany ........................... 2252540

[52] U.S. Cl. ....... 179/15 BA; 179/15 A; 179/15 BD

[51] Int. Cl. ............................................. H04j 3/08

[58] Field of Search ......... 179/15 BA, 15 BC, 15 A, 179/15 BD; 178/68; 340/147 C, 150

[56] References Cited

UNITED STATES PATENTS

| | | | |
|---|---|---|---|
| 3,358,083 | 12/1967 | Helm | 179/15 BC |
| 3,510,595 | 5/1970 | Gutleber | 179/15 BC |
| 3,715,508 | 2/1973 | Blasbalg | 179/15 BC |
| 3,748,388 | 7/1973 | Codina | 179/15 BA |

*Primary Examiner*—David L. Stewart
*Attorney, Agent, or Firm*—Spencer & Kaye

[57] ABSTRACT

A method of transmitting and receiving data transmitted via a binary transmission channel according to a code multiplex method wherein a plurality of data sources transmit data in the form of a receiver-specific coded binary sequence per data bit. At each of the data sources, the respective coded binary sequence is transformed to a transformed coded binary sequence which changes its polarity per bit clock pulse whenever a bit of the specific original coded binary sequence is present. The plurality of transformed coded binary sequences are added in a mod 2 adder to form a binary sequence which corresponds to the mod 2 sum signal of all of the transformed coded binary sequences, and the mod 2 sum signal is transmitted via the transmission channel as a binary sequence. At the receiving end, each receiver detects its specific binary coded signal in the mod 2 sum signal and regenerates the data bits.

6 Claims, 4 Drawing Figures

CODE MULTIPLEX METHOD USING A BINARY CHANNEL

BACKGROUND OF THE INVENTION

The present invention relates to a code multiplex process for the transmission of data via a binary channel in which a plurality of sources transmit data in the form of a coded binary sequence per data bit.

It is known to effect the transmission of data via a binary channel according to the time multiplex process with pulse code modulated (PCM) signals. This technique, however, requires strict frame synchronization, which has a disadvantageous effect as regards the flexibility of the system. Additionally, the switching of the PCM signals at the network nodes is very complicated.

In flexible systems, such as, for example, when transmitting data via satellite, it is therefore the practice to use asynchronous systems, such as the code multiplex method. In this case each transmitter modulates the actual data bits with a receiver-specific binary sequence, i.e., a binary sequence which is specific to a particular receiver, and transmits it periodically without regard to the phase position of the transmitted sequence with respect to the sequences transmitted from other stations. In the satellite converter, all of the incoming sequences are added, amplified and sent out again. Each receiver station recognizes its specific sequence, and thus the data intended for it, by correlation reception. A specific data source and a specific sequence generator are for example, described by W. W. Peterson: "Error correcting Codes" John Wiley & Sons, Inc., New York 1961, P. 107 ff. A code multiplex system of the type as described is, for example, described by J. W. Schwartz et al: "Modulation Techniques for Multiple Access to a Hard-Limiting Repeater" Proc. IEEE, Vol. 54, No. 5, p 763 – 76 (May 1966). One disadvantage of the known prior art systems, however, is that a binary transmission channel cannot be used, since with a binary transmission channel the addition of individual sequences is not possible.

SUMMARY OF THE INVENTION

It is the object of the present invention to provide a method of transmitting a collection of data according to the code multiplex technique in a data channel which is able to transmit but two states while assuring great freedom from error.

This is accomplished according to the present invention in that at the transmitting end the coded binary sequences to be transmitted from the respective data sources are initially transformed to a transformed coded binary sequence whose polarity per bit clock pulse changes whenever a bit of the original coded binary sequence is present; that the transformed coded binary sequences of the respective data sources are added in a mod 2 adder with a shift in phase so that a binary sequence results which corresponds to the mod 2 sum of all of the transformed coded binary sequences; that the mod 2 sum signal is fed as a binary sequence into a binary data channel for transmission to the receivers, and that at the receiving end the specific coded binary signal associated with the respective receiver is detected and the associated data bits are regenerated.

According to one embodiment of the invention, the specific coded binary signal is detected and the data bits are regenerated by forming an analog sum signal from the mod 2 sum signal and then correlating the analog sum signal with a signal corresponding to the coded binary sequence associated with the specific channel. The analog sum signal is preferably formed by adding an amplitude stage of the duration of a bit of the coded binary sequence to the received signal for each change in the mod 2 sum signal.

The present invention makes it possible to transmit code multiplex signals over binary channels, as for example a glass fiber line, which transmits, for example, the state "light" as a logic 1 and the state "no light" as a logic 0. Thus it is possible to connect radio links to an integrated telephone and data network without complicated synchronizing measures. If the various data sources transmit the transformed coded binary sequences in any desired phase position, the number of using parties can be increased without this resulting in substantial interference by faulty correlation. If, however, the transmissions of the transformed coded binary sequences are timed quantized, the occurrence of bit errors is quite substantially and dependably reduced.

According to another embodiment of the invention, a further improvement in the detection of the data bits for the particular recipient can be achieved if the correlation is effected between a signal corresponding to the differentiated and rectified original coded binary sequence and the differentiated and rectified mod 2 sum signal.

DESCRIPTION OF THE PREFERRED EMBODIMENTS

Figure 1:
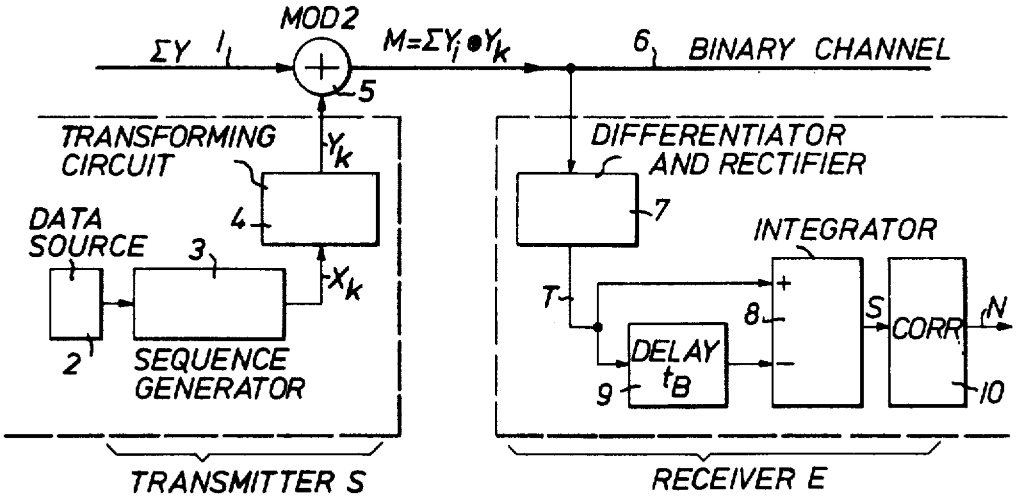
FIG. 1 is a schematic block circuit diagram of a circuit arrangement for practicing the method according to the present invention.

Referring now to FIG. 1, there is shown a transmission channel 1 whose code multiplex signal $\Sigma Y_i$, which has been produced according to the method of the present invention, is to be fed with further data from a data source 2 of a transmitter S according to the method of the present invention. For this purpose the data bits from the data source 2 are transformed or modulated bit by bit in a known manner by a sequence generator 3 contained in the transmitter to form receiver-specific positive and negative coded binary sequences $X_k$.

According to the present invention, the coded binary sequences $X_k$ are then transformed in a transforming circuit 4 to a transformed coded binary sequence $Y_k$ which has a change in polarity per bit clock pulse for each bit of the original sequence $X_k$. The output of the transforming circuit 4 is connected to one input of a mod 2 adder 5 whose input receives the code multiplex signal $\Sigma Y_i$, which at this point has not yet been modulated by a signal from the data source 2. At the output of the mod 2 adder 5 there now appears a binary sequence corresponding to the code multiplex signal M $= \Sigma Y_i + Y_k$ ( + = mod 2 addition) which has been modulated with the data from data source 2 and which is then transmitted, in any desired manner well known in the art, as a binary sequence through transmission channel 6. Connected to the outgoing data transmission line 6 at any desired point is a receiver E. Although only one receiver is shown, it is to be understood that this is by way of example only. According to the embodiment of the invention illustrated in FIG. 1, the receiver E includes a differentiating and rectifying circuit 7 whose input is connected with the transmission channel 6, an integrator 8 connected to the output of the circuit 7 and a correlator 10 connected to the output of the integrator 8. One input of the integrator 8, for example the positive input as illustrated, is directly connected to the output of the circuit 7, while the opposite polarity input of integrator 8, i.e., the negative input as illustrated, is connected to the output of circuit 7 via a delay line 9 having a delay time $t_B$ equal to the duration of one bit of the binary coded sequence $X_k$. The output of integrator 8 will then contain the known analog code multiplex signal S from which the data bits are regenerated in a known manner in the series-connected correlator 10.

Figure 2:
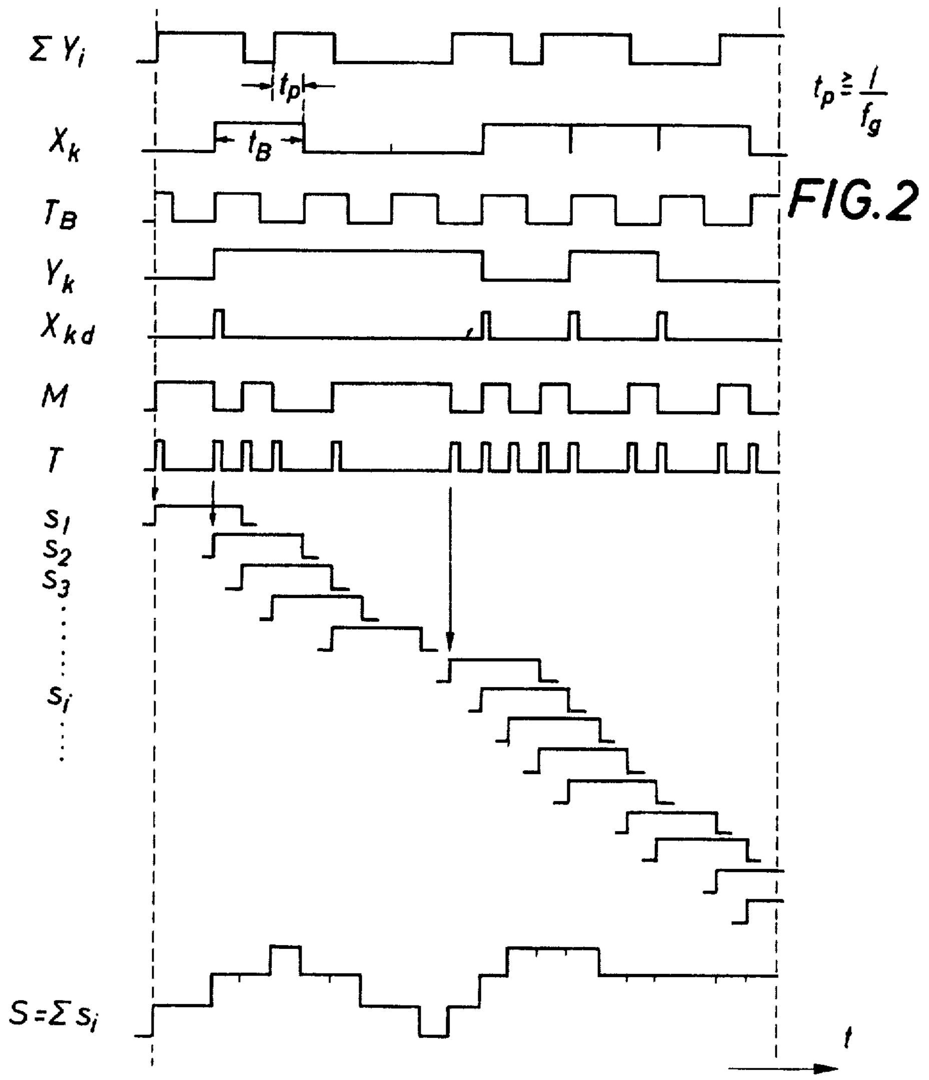
FIG. 2 is a time diagram used to explain the signal processing and signal regeneration according to the embodiment of the invention shown in FIG. 1.

Referring now to FIG. 2, operation of the embodiment illustrated in FIG. 1 is shown in a time diagram for the signal processing. The time $t$ is used as the abscissa of the time diagram. A specific embodiment of a correlator suitable for the correlator 10 of the code multiplex receiver is, for example, described by S. W. Golomb: "Digital Communications with Space Applications" Prentice Hall Inc., 1964, p. 87 ff.

The incoming code multiplex signal $\Sigma Y_i$ (line 1 of FIG. 2) is to be modulated by transmitter S with the data bits from source 2 which are transformed to sequences $X_k$ (line 2 of FIG. 2). This modulation is effected, according to the invention, by mod 2 addition.

Since the mod 2 sum signal does not permit a conclusion as to the polarity of a transmitted individual sequence, i.e., the polarity is continuously changed by the other signals, the information thus lies only in the changes, i.e., the 0-1 and the 1-0 transitions, of the mod 2 sum signal, the original sequences $X_k$ must initially be transformed before they can be added to the mod 2 sum signal. According to the present invention, the original coded binary sequences $X_k$ are transformed in the circuit 4, to a transformed sequence $Y_k$ (line 4 of FIG. 2) whose polarity is changed per bit clock pulse whenever a bit of the original sequence $X_k$ (line 2) is present.

In the mod 2 adder 5, the transformed sequence $Y_k$ (line 4 of FIG. 2) and the multiplex signal $\Sigma Y_i$ (line 1 of FIG. 2) are added and the result of this mod 2 addition is the multiplex signal M (line 6 of FIG. 2).

With this method it is possible to effect that each signal change in the binary code multiplex signal M indicates a positive change or the presence of a bit of the original sequence. This fact is utilized at the receiving end of the transmission system to detect the original sequence.

As is conventional in the art, the pulse duration of the bit clock pulse $T_B$ of the data source and the original sequence $X_k$ are tuned to that of the receiver. The receiving party tries to select the data intended for him by correlating a signal corresponding to the original sequence $X_k$ which is specific to a particular receiver with the received code multiplex signal M. To enable this correlation, according to the FIG. 1 embodiment of the invention, the code multiplex signal M is differentiated and rectified in the circuit 7 of the receiving party, so that the pulse sequence T (line 7 of FIG. 2) results. This pulse sequence T is fed directly to the positive input of the integrator 8 and, in order to provide a delay of the bit clock pulse duration $t_B$, to the negative input of the integrator 8 via the delay line 9.

Each pulse of the signal T arriving at the positive input of the integrator 8 thus effects an increase in the output signal of the integrator 8 which corresponds to the areal content of the pulse, while each pulse arriving with a delay $t_B$ at the negative input of the integrator 8 effects a decrease in the output signal of the integrator 8. The pulse $s_1$ which is produced only by the first pulse of signal T is shown in line 8 of FIG. 2. Since the delay time of the delay line 9 is $t_B$, the pulse duration of pulse $s_1$ is exactly $t_B$. Thus, in the same manner, the second pulse of pulse sequence T produces pulse $s_2$ (shown in line 9 of FIG. 2), the third pulse of pulse sequence T produces pulse $s_3$, etc.

Since the pulses $s_1$ - $s_i$ are superimposed in the integrator 8, the sum signal $S = \Sigma s_i$ results at the output of the integrator 8 which sum signal corresponds to the known analog code multiplex signal. From this signal the data can subsequently be selected in a known manner by the correlator 10 as a sequence of data bits X and can then be processed further.

When noise-like sequences are used — and these are of particular interest for the transmission of sequences with arbitrary phase shifts — no strict orthogonal system exists since the cross-correlation coefficient of a particular sequence does not disappear with the sum of all other sequences. It is thus necessary to use very long sequences which contain so much similarity information that they can be found in the sum signal S with great probability. In order to be able to use shorter sequences, according to a further embodiment of the invention, it is therefore advantageous not to regenerate the analog sum signal S (last line of FIG. 2) from the signal T (line 7 of FIG. 2) for correlation purposes, but rather to directly correlate the signal T with a signal $X_{kd}$ (line 5 of FIG. 2).

Figure 4:
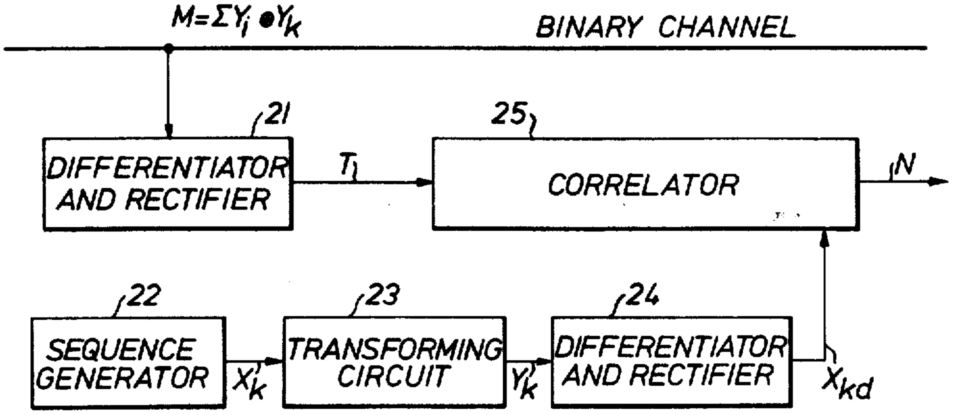
FIG. 4 is a schematic block circuit diagram of a circuit arrangement, which simplifies the receiver shown in FIG. 1.

This signal $X_{kd}$ is produced by differentiating and rectifying the transformed binary sequence $Y_k$ which is made available in the correlator 10 associated to the specific receiver E. It is thus no longer necessary to have the delay line 9 and the integrator 8 in the receiver so that the modified correlator 10 in this case receives the pulse sequence T directly from the circuit 7. FIG. 4 shows, how the signal $X_{kd}$ can be generated from the signal $X_k$: First, signal $X_k$ is transformed by circuit 23 into signal $Y_k$ (which is the same as circuit 4 in FIG. 1). Then signal $Y_k$ is differentiated and rectified by circuit 24 (which is the same as circuit 7 in FIG. 1). The signal $X_{kd}$ thus generated is now correlated with the signal T.

Figure 3:
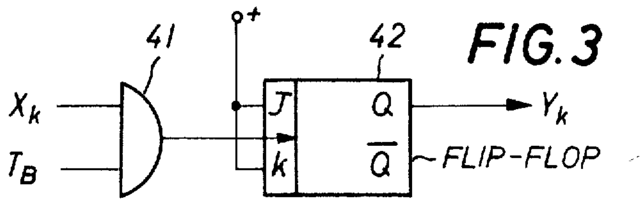
FIG. 3 is a block circuit diagram of a transforming device for use with the method according to the invention.

A block circuit diagram for a transforming circuit 4 suitable for processing the code multiplex signal according to the present invention is shown in FIG. 3. The circuit includes an AND circuit 41 having two inputs. The output of the AND circuit 41 is connected to the clock pulse control input of a bistable flip-flop circuit 42 whose inputs are connected together.

The bit clock pulse signal $T_B$ (line 3 of FIG. 2) of the transmitter S is fed to one input of the AND circuit 41 and the binary sequence $X_k$ (line 2 in FIG. 2) which is to be transformed is fed to the second input. When both signals, i.e., $T_{ii}$ and $X_k$, are present with the same polarity, the AND circuit 41 emits an output signal which causes the flip-flop 42 to flip into its other stable state. The transformed binary sequence $Y_k$ (line 4 in FIG. 2) is obtained directly from one of the two outputs of the flip-flop 42.

In the code multiplex method according to the invention it is advantageous if the individual sequences show a phase shift $t_p$ with respect to one another which is at least as great as the reciprocal value of the frequency limit $f_g$ of the electronic system of the transmission channel, the transmitter and the receiver. For this purpose the binary sequences of the individual data sources are each shifted in phase with respect to one another by the time $t_p \geq 1/f_g$ as indicated in lines 1 and 2 of FIG. 2. This phase shift may be effected in a known manner by time quantizing.

A circuit suitable for and the manner of time quantizing of the respective data sequence to provide the desired phase shift is disclosed in British Pat. No. 1,249,556, published Oct. 13, 1971, which corresponds to U.S. Pat. No. 3,566,155, issued Feb. 23rd, 1971, to S. J. De Maio et al.

The phase shift of the various binary sequences may be effected, however, with the acceptance of a determinable error probability, by simply transmitting the binary sequences in any desired random manner.

It will be understood that the above description of the present invention is susceptible to various modifications, changes and adaptations, and the same are intended to be comprehended within the meaning and range of equivalents of the appended claims.

I claim:

1. A method of transmitting data via a binary transmission channel between a plurality of data sources and a plurality of receivers according to the code multiplex method comprising the steps of:

providing the data to be transmitted from each of the data sources in the form of a receiver-specific coded binary sequence ($X_k$) per data bit;

transforming each of the coded binary sequences ($X_k$) to a respective transformed binary sequence ($Y_k$) which changes its polarity per bit clock pulse whenever a bit of the original binary sequence ($X_k$) is present;

adding the transformed binary sequences ($Y_k$) of the individual data sources in mod 2 with a shift in phase to form a binary sequence (M) which corresponds to the mod 2 sum of all of the transformed binary sequences ($Y_k$);

feeding the sum signal (M) to the binary data channel as a binary sequence for transmission to the receivers; and at each of the receivers, detecting the specific coded binary sequence associated with the respective receiver and regenerating the data bits associated with the specific coded binary sequence.

2. The method as defined in claim 1 wherein said step of detecting and regenerating includes:

forming an analog sum signal from the received mod 2 sum signal; and correlating the analog sum signal with a signal corresponding to the coded binary sequence ($X_k$) associated with the specific receiver.

3. The method as defined in claim 2 wherein said step of forming comprises:

differentiating and then rectifying the mod 2 sum signal to form an output signal T;

applying the signal T directly to one input of an integrator; and applying the signal T to the opposite polarity input of the integrator after a delay of the duration of one bit of the coded binary sequence ($X_k$) whereby a constant amplitude signal of the duration of a bit of the binary sequence is added to the output signal from the integrator for every change in the mod 2 sum signal.

4. The method as defined in claim 1 wherein said transformed binary sequences ($Y_k$) of the data sources are added in mod 2 in any desired phase position with respect to one another.

5. The method as defined in claim 1 wherein said transformed binary sequences are transmitted in a time quantized manner so that all partial sequences of the mod 2 sum signal have a minimum phase shift $t_p \geq 1/f_u$ with respect to one another, where $f_u$ is the frequency limit of the electronics of the transmission system.

6. The method as defined in claim 1 wherein said step of detecting and regenerating comprises:

differentiating and then rectifying the mod 2 sum signal; and correlating the differentiated and rectified mod 2 sum signal with a signal ($X_{kd}$) corresponding to the differentiated and rectified transformed binary sequence associated with the specific receiver.

* * * * *

UNITED STATES PATENT OFFICE

CERTIFICATE OF CORRECTION

PATENT NO. : 3,885,105

DATED : May 20th, 1975

INVENTOR(S) : Rupert Hildenbrand

It is certified that error appears in the above-identified patent and that said Letters Patent are hereby corrected as shown below:

In the heading of the patent, under [73] Assignee:, change "Liicentia-Pantent-Verwaltungs-G.m.b.H," to --Licentia Patent-Verwaltungs-G.m.b.H.--.

Column 2, line 20, change "timed" to --time--;
line 64, before "input" insert --other--.

Column 3, line 1, change "+" to -- ⊕ -- (both occurrences).

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*